UNITED STATES PATENT OFFICE.

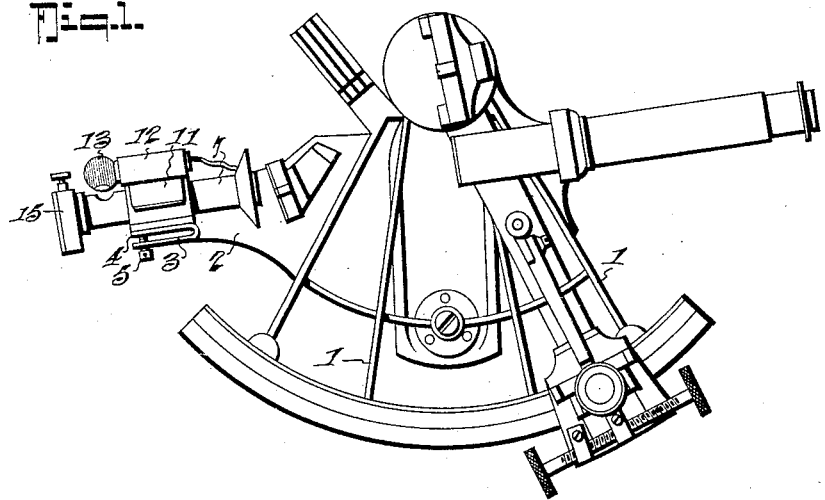
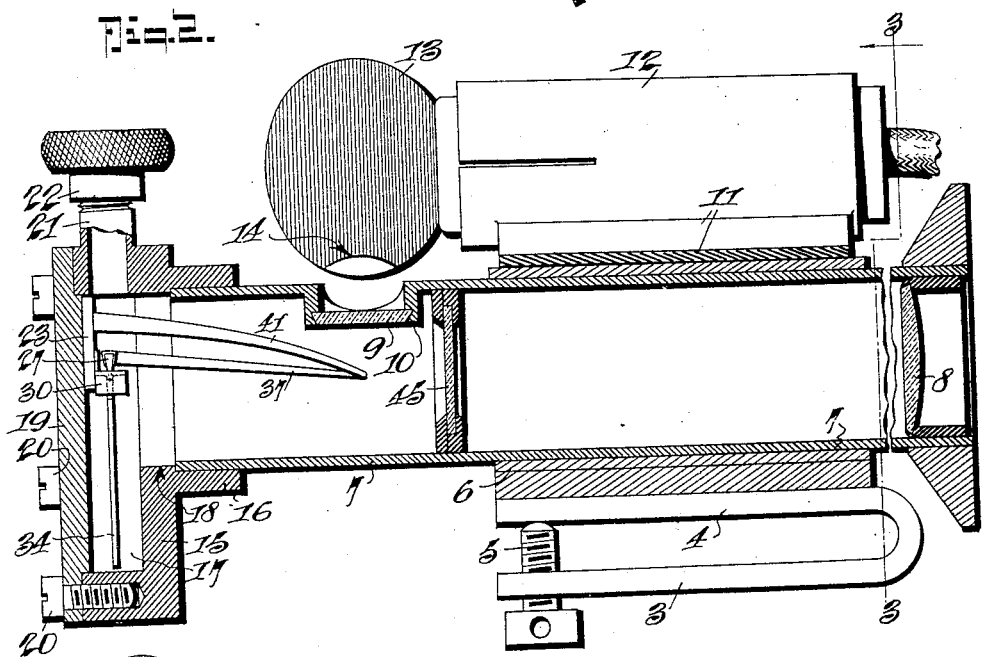
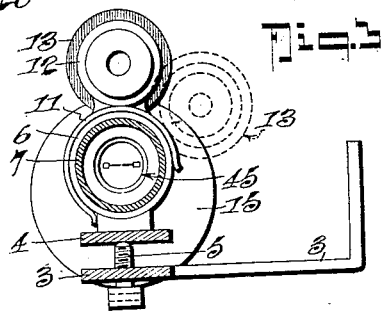

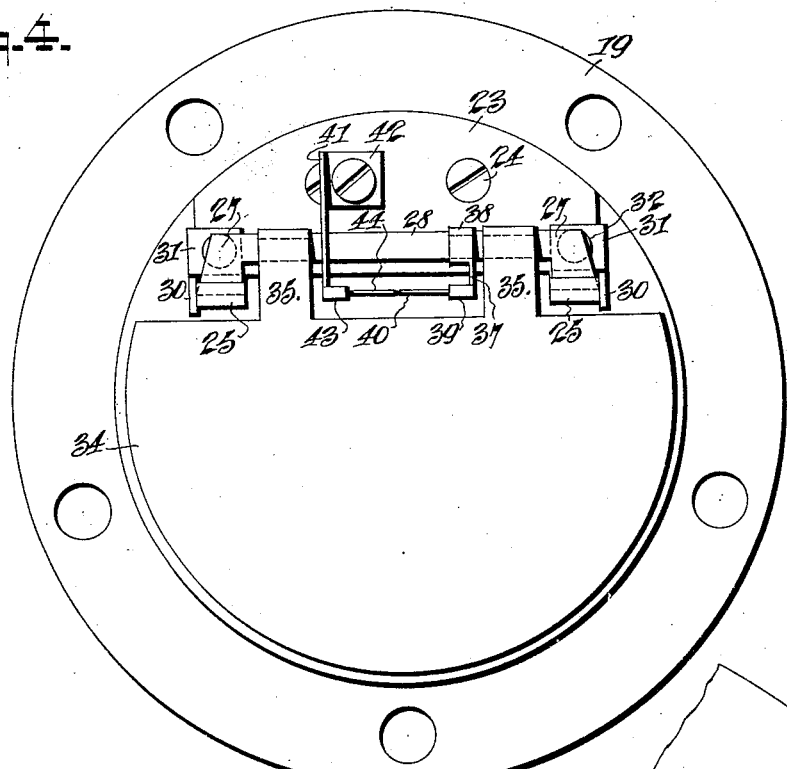
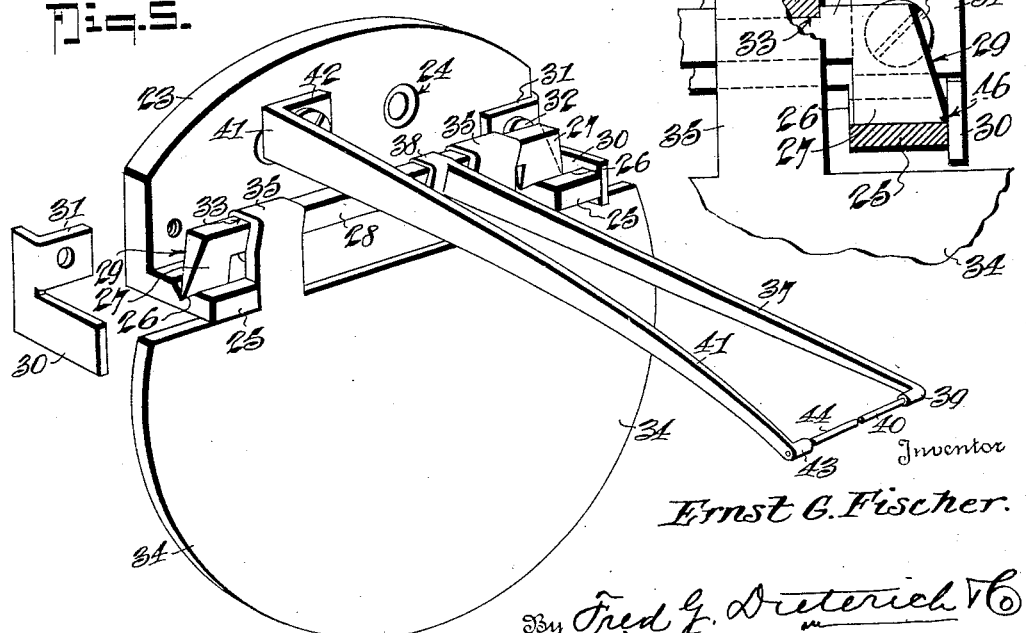

ERNST G. FISCHER, OF WASHINGTON, DISTRICT OF COLUMBIA.

ARTIFICIAL HORIZON.

1,409,938.  Specification of Letters Patent.  Patented Mar. 21, 1922.

Application filed June 5, 1919. Serial No. 301,920.

*To all whom it may concern:*

Be it known that I, ERNST G. FISCHER, a citizen of the United States, residing at Washington, in the District of Columbia, have invented a new and Improved Artificial Horizon, of which the following is a specification.

This invention has for its object to provide an artificial horizon for sextants, hand or mounted levels, and other surveying and astronomical apparatus requiring exact definition of either the horizon or vertical.

In its generic nature the invention comprises a pendulum device having a horizon line which is cooperative with another horizon line that is relatively fixedly mounted on the instrument whereby when the instrument is moved to bring both lines in alignment, the same will correspond to the true horizon.

In its more specific nature the invention includes a pendulum-vane of small mass but large area, suspended upon knife edges, in its motions opposed to air or a suitable liquid so that its oscillations are damped and as nearly dead-beat as is practicable, yet sensitive to the smallest departures from the normal; a small light arm being attached to the pendulum vane and carrying a piece of fine platinum wire mounted horizontally, there being a similar piece of platinum wire fixed to the apparatus supporting the pendulum-vane in such manner that, when adjusted and the vane is at rest, the wires are in one horizontal line.

Inasmuch as my invention has been especially designed for use in connection with the sextant, I have illustrated the invention as applied to such an instrument and shall describe the same in that relation, although I wish it understood that in its use the invention is not limited to sextants but may be employed wherever a device of this nature is found useful.

In its more subordinate nature, the invention also includes those novel details of construction, combination and arrangement of parts, all of which will be first fully described and then be specifically pointed out in the appended claims, and illustrated in the accompanying drawings, in which:—

Figure 1 is an elevation of a sextant with the invention applied.

Figure 2 is an enlarged vertical longitudinal section of the invention.

Figure 3 is a reduced transverse section on the line 3—3 of Figure 2, looking in the direction of the arrow.

Figure 4 is an enlarged elevation of the cap disk which supports the operative parts of the pendulum mechanism.

Figure 5 is a detail perspective view of the pendulum mechanism and the bracket which supports the same.

Figure 6 is an enlarged detail view of a portion of the same.

In the drawings, in which like numerals of reference indicate like parts in all of the figures, 1 represents the sextant which is of the ordinary construction and, per se, forms no part of the invention and a detailed description of the same is thought to be unnecessary. When my invention is applied to sextants, the same is provided with an arm 2 to which a bracket 3 is secured that is provided with a U-shaped portion formed by bending back a part 4 on which part 4 the device is mounted. 5 is an adjustment screw by which the axis of the device may be inclined to line up properly with the telescope of the sextant. Secured to the plate 4 is a holder 6 in which is suitably mounted a tube 7. The forward end of the tube 7 is provided with a collimating lens which is so mounted that its principal focus lies in the horizontal wires 40—44, hereinafter again referred to. At the outer end of the tube 7 is mounted the pendulum device 34 which constitutes the essential part of the device. This device consists of a receptacle 15 mounted on the end of the tube 7 and bored at 18 to communicate with the interior of the tube 7, the holder 15 having a collar 16 to receive the tube 7. The holder 15 has a pocket or chamber 17 in which the vane is held. 19 is the disk or cap plate for the holder 15 on which the pendulum apparatus is mounted, the cap 19 being secured by cap screws 20, as shown.

The tube 7 is provided with a window 9 that is mounted in the inwardly projecting collar 10 so constructed as to prevent the accumulation of air bubbles on the glass of the window 9 when liquid is used as a damping medium. Adjacent to the window 9 the tube 7 is provided with a transparent partition 45, when liquid is used as a damping medium, as will be later explained.

12 is a lamp socket mounted on a clip holder 11 that clips over the tube holder 6 and can be turned about the axis of the tube (see Figure 3) so that the bulb 13 will be brought with its transparent portion 14 to register with the window 9 or be moved to one side out of register with the same (see dotted lines Figure 3) it being understood that the bulb 13 is preferably rendered opaque, except for the area 14 directly above the window 9 when the parts are in the position shown in Figures 1 and 2. The illuminating power for the lamp 13 can be obtained from any desired source, either by a battery in the handle of the sextant, (not shown) or in any other desired way.

By referring now directly to Figures 2, 4, 5 and 6, the construction and manner of mounting the pendulum-vane will be clear. 23 designates a bracket body having knife bearing lugs 25 projecting from the same, the lugs 25 having V grooves 26 to receive the knife ends 27 which are connected by the cross bar 28. The knife bearing ends 27 are bevelled off, as at 29, (see Figure 6) so that only a point will be presented to the end plates 30 at the pivotal axis of the pendulum to prevent lateral displacement of the bearing knives 27 in their grooves 26 (see Figure 6). 30 designates end plates having ears 31 apertured and secured by screws 32 to the bracket 23, the plates 30 lying against the bearing projections 25 at the ends of the knife bar, as shown and they are preferably of greater depth than the depth of the bearing projections 25 so as to form stops at 46 to prevent the knives 27 falling out of the grooves 26 when the instrument is inverted or jarred. The bracket body 23 is secured at 24 to the cap 19.

The knife bar 28 is provided with a plurality of recesses 33 in which the arms 35 of the pendulum vane 34 are held by bending the same around the bar 28, a third notch being provided to receive the end 38 of the arm 37 which is rigidly secured to the bar 28 and projects into the tube 7, the arm 37 being provided at its forward end with a socket 39 to hold a fine wire 40, preferably of platinum, the wire 40 lying parallel to the pivotal axis of the pendulum-vane and in horizontal alignment with the same. 41 is a fixed arm that is secured at 42 to the bracket 23 and it also has a socket 43 to hold a wire 44, also preferably of platinum, the wires 40 and 44, when the apparatus is adjusted and the pendulum-vane is at rest, lying in alignment with one another so as to constitute the artificial horizon line (see Figures 2, 4 and 5).

In use, the light from the lamp 13 is directed through the window 9 onto the wires 40 and 44 and transmitted as parallel rays by the lens 8 to the telescope of the sextant. In day light observations the necessary light may be admitted through the window from above, and in that event the lamp 13 is moved to the dotted position shown in Figure 3 so as to expose the window 9. 21 is a duct for delivering liquid into the chamber 17 and tube 7 when it is desired to use liquid as the damping medium, the duct 21 being closed by a removable cap 22.

In the preferred construction, the chamber 17 and tube 7 is substantially filled with a suitable limpid, non-freezable oil, the oil being confined by the transparent partition 45. The amount of damping desired, either in air or in liquid, can be varied by varying the area of the vane 34; the width of the space or clearance between the edges and the sides of the containing chamber, and the space between the faces of the vane and the walls of the chamber against which it swings may be also varied to vary the amount of damping.

From the foregoing, it will be observed that when the sextant and artificial horizon are properly adjusted and the instrument is held so that the fixed wire 44 and the pendulum wire 40 appear as one line, while the image of the celestial or terrestrial object is either in contact with or bisected by this line, the reading of the vernier on the arc will be the altitude of the body observed.

From the foregoing description, taken in connection with the accompanying drawings, it is thought the complete construction, operation, uses and advantages of my invention will be readily understood by those skilled in the art.

What I claim is:—

1. A device of the character described comprising a support, a pendulum-vane mounted on said support, a "line" carried by said vane, a "line" relatively fixed with regard to said support and cooperative with said vane carried "line" for the purposes specified, and a housing for the vane closely conforming to the margin of the vane and adapted to contain a damping medium.

2. In a device of the character described, a housing having a chamber closed by a cap, a bracket mounted on the cap and having a knife receiving bearings, a knife mounted in said bearings, a pendulum vane mounted on the knife and an indicator operative with the pendulum vane, and a second indicator relatively fixed and cooperating with the first mentioned indicator.

3. In a device of the character described, a housing having a chamber closed by a cap, a bracket mounted on the cap and having knife receiving bearings, a knife mounted in said bearings, a pendulum vane mounted on the knife and an indicator operative with the pendulum vane, a second indicator relatively fixed and cooperating with the first mentioned indicator, and means for retaining the knife in its bearings against displacement.

4. In a device of the character described, a housing having a chamber closed by a cap, a bracket mounted on the cap and having knife receiving bearings, a knife mounted in said bearings, a pendulum vane mounted on the knife and an indicator operative with the pendulum vane, a second indicator relatively fixed and cooperating with the first mentioned indicator, and means for damping the oscillations of the pendulum vane.

5. In a device of the character described, a housing having a chamber closed by a cap, a bracket mounted on the cap and having knife receiving bearings, a knife mounted in said bearings, a pendulum vane mounted on the knife and an indicator operative with the pendulum vane, a second indicator relatively fixed and cooperating with the first mentioned indicator, means for retaining the knife in its bearings against displacement, and means for damping the oscillations of the pendulum vane.

6. In apparatus of the class described, a tube, a chambered body mounted on the tube and having a chamber in communication therewith, a support mounted within the chamber and having bearings, a pendulum-vane mounted on said bearings, an arm carried by the vane and projecting into said tube, an indicator carried by the arm, a second indicator relatively fixedly held in the tube and adapted to align with said pendulum indicator when the tube is in the horizontal position, substantially as shown and described.

7. In apparatus of the class described, a tube, a chambered body mounted on the tube and having a chamber in communication therewith, a support mounted within the chamber and having bearings, a pendulum-vane mounted on said bearings, an arm carried by the vane and projecting into said tube, an indicator carried by the arm, a second indicator relatively fixedly held in the tube and adapted to align with said pendulum-vane indicator when the tube is in the horizontal position, said tube having a window through which light may be admitted directly onto said indicators.

8. In apparatus of the class described, a tube, a chambered body mounted on the tube and having a chamber in communication therewith, a support mounted within the chamber and having bearings, a pendulum-vane mounted on said bearings, an arm carried by the vane and projecting into said tube, an indicator carried by the arm, a second indicator relatively fixedly held in the tube and adapted to align with said pendulum-vane indicator when the tube is in the horizontal position, said tube having a window through which light may be admitted onto said indicators, and an artificial illuminating medium mounted on said tube and adapted to project its light through said window, said artificial illuminating medium adapted to be moved out of register with said window when desired.

9. In a device of the character described, a containing support, a pendulum-vane mounted in said support, a fixed indicator line within the support, a second indicator line carried by the pendulum-vane to cooperate with the fixed indicator line, said pendulum-vane comprising a thin body of relatively large area opposed to the direction of movement, said body being of small mass substantially as shown and described.

10. In a device of the character described, a containing support, a pendulum-vane mounted in said support, a fixed indicator line within the support, a second indicator line carried by the pendulum-vane to cooperate with the fixed indicator line, said pendulum-vane comprising a thin body of relatively large area opposed to the direction of movement, said body being of small mass, said containing support including a chamber for the pendulum-vane which closely conforms to the edge of the vane and a fluid damping medium contained within said support, substantially as shown and described.

11. In a device of the character stated, a containing support, a pendulum-vane mounted in said support, a fixed indicator "line" within the support, a second indicator line carried by the pendulum-vane and adapted to cooperate with the fixed indicator "line" and lie in longitudinal alignment with the same when the instrument is in the horizontal position, said pendulum-vane comprising a sheet metal body having a relatively large area opposed to the direction of movement, said body being of small mass substantially as shown and for the purposes described.

12. A device of the character described comprising a support, a pendulum-vane on said support, a "line" carried by said pendulum-vane, a relatively fixed "line" carried by said support, said "lines" adapted to lie in longitudinal alignment with their axes coinciding when the device is in the horizontal position, substantially as shown and described.

13. In a device of the character described, a containing support, a pendulum-vane mounted in said support, a relatively fixed indicator "line" mounted in the support and a second indicator "line" carried by the pendulum-vane, a collimating lens carried by the support, said "lines" being positioned to lie in axial alignment passing through the principal focus of said lens when the instrument is in the horizontal position, and means by which said "lines" may be illuminated to cause their image to be transmitted through the collimating lens.

ERNST G. FISCHER.